US009363494B2

(12) United States Patent  (10) Patent No.: US 9,363,494 B2
Farah  (45) Date of Patent: Jun. 7, 2016

(54) DIGITAL VIDEO RECORDER THAT ENABLES RECORDING AT A SELECTED RESOLUTION

(71) Applicant: AT&T Intellectual Property I, L.P., Atlanta, GA (US)

(72) Inventor: Jeffrey Joseph Farah, North Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/705,297

(22) Filed: Dec. 5, 2012

(65) Prior Publication Data

US 2014/0153907 A1  Jun. 5, 2014

(51) Int. Cl.
| | |
|---|---|
| H04N 5/76 | (2006.01) |
| H04N 9/79 | (2006.01) |
| H04N 5/775 | (2006.01) |
| H04N 21/4147 | (2011.01) |
| H04N 21/4402 | (2011.01) |
| H04N 21/45 | (2011.01) |

(52) U.S. Cl.
CPC .............. *H04N 9/7921* (2013.01); *H04N 5/775* (2013.01); *H04N 21/4147* (2013.01); *H04N 21/440263* (2013.01); *H04N 21/4532* (2013.01)

(58) Field of Classification Search
None
See application file for complete search history.

(56) References Cited

U.S. PATENT DOCUMENTS

| | | | |
|---|---|---|---|
| 8,229,283 B2 | 7/2012 | Ellis | |
| 2002/0035254 A1* | 3/2002 | Chemburkar | ........ C07D 239/10 544/316 |
| 2002/0056123 A1* | 5/2002 | Liwerant et al. | ................ 725/87 |
| 2002/0196344 A1* | 12/2002 | McIntyre | ............... G06Q 30/06 348/207.1 |
| 2003/0152361 A1* | 8/2003 | Kawai | ...................... H04N 5/76 386/214 |
| 2004/0080515 A1* | 4/2004 | Hagiwara | ..................... 345/581 |
| 2004/0086200 A1* | 5/2004 | Aas | ......... G06T 3/403 382/298 |
| 2005/0088516 A1* | 4/2005 | Song et al. | ....................... 348/51 |
| 2005/0130585 A1* | 6/2005 | Gnuschke | .......... H04L 65/4084 455/3.06 |
| 2005/0259752 A1* | 11/2005 | Iwata et al. | .............. 375/240.26 |
| 2006/0005223 A1* | 1/2006 | Weng et al. | ..................... 725/89 |
| 2007/0104456 A1 | 5/2007 | Craner | |
| 2008/0097690 A1* | 4/2008 | Skarine | ......................... 701/206 |
| 2008/0201461 A1* | 8/2008 | Yoshiuchi | ..................... 709/223 |
| 2009/0010559 A1* | 1/2009 | Inagaki | ......................... 382/253 |
| 2009/0074054 A1* | 3/2009 | Miyauchi | .............. G06T 3/4084 375/240.01 |
| 2009/0254960 A1* | 10/2009 | Yarom et al. | ................... 725/115 |
| 2011/0091025 A1* | 4/2011 | Francisco | .................. 379/93.02 |
| 2011/0103472 A1* | 5/2011 | LeFebvre et al. | ......... 375/240.12 |
| 2011/0243535 A1* | 10/2011 | Roberts et al. | ................ 386/291 |
| 2011/0258665 A1 | 10/2011 | Fahrny et al. | |
| 2011/0321100 A1 | 12/2011 | Tofighbakhsh | |
| 2012/0079054 A1 | 3/2012 | Moroney et al. | |
| 2012/0192234 A1 | 7/2012 | Britt et al. | |

* cited by examiner

*Primary Examiner* — Hung Dang
*Assistant Examiner* — Sunghyoun Park
(74) *Attorney, Agent, or Firm* — Toler Law Group, PC

(57) ABSTRACT

A particular method includes receiving a request to record television programming at a digital video recorder. The request specifies a recording resolution. The method includes receiving the television programming at a first resolution at the digital video recorder and determining whether the first resolution matches the recording resolution. The method includes converting the television programming at the first resolution to the recording resolution with the digital video recorder in response to determining that the first resolution is different than the recording resolution. The method also includes storing, via the digital video recorder, the television programming at the recording resolution at a storage device.

20 Claims, 8 Drawing Sheets

DIGITAL VIDEO RECORDER THAT ENABLES RECORDING AT A SELECTED RESOLUTION

FIELD OF THE DISCLOSURE

The present disclosure is generally related to a digital video recorder that enables recording at a selected resolution.

BACKGROUND

A digital video recorder may be used to record television programming as recorded content and to later playback the recorded content when convenient. The digital video recorder may include functionality for recording television programming, managing recorded content, and playing recorded content to a display device. When a user records television programming, the television programming may be recorded at a resolution associated with a channel being recorded or a resolution associated with a service level agreement with a service provider.

DETAILED DESCRIPTION

Figure 1:
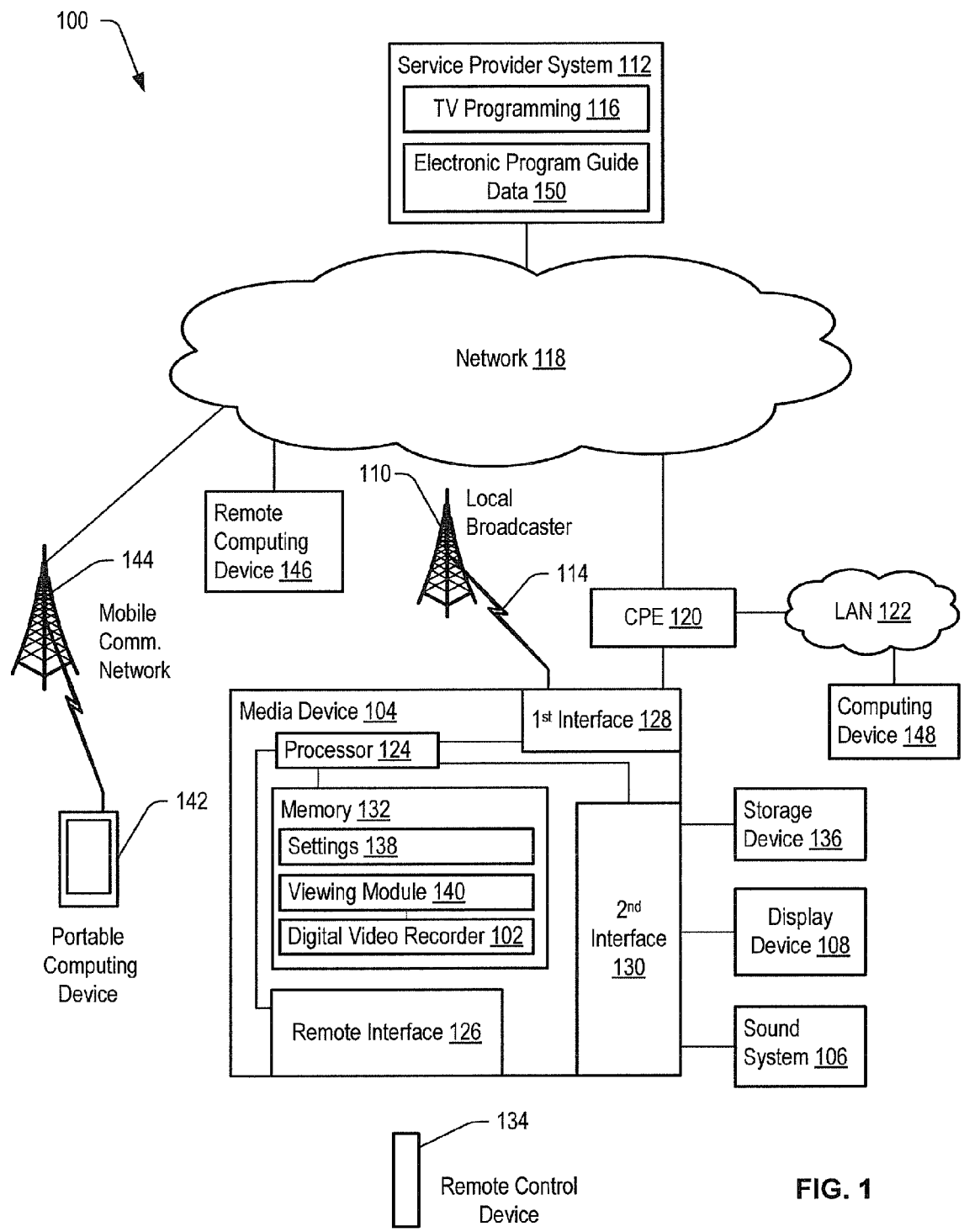
FIG. 1 is a block diagram of a first embodiment of a system including a digital media recorder that enables recording at a selected resolution.

A digital video recorder may be used to record television programming. The digital video recorder may be associated with a particular device (e.g., a set-top box, a computer system, a mobile communication device, etc.) or may be a network digital video recorder that is able to receive requests from remote devices associated subscribers to a service. When a user chooses to record particular television programming, a digital video recorder interface may be presented to the user. The digital video recorder interface may enable the user to select a recording resolution for the recording. The recording resolution may be higher than, the same as, or lower than a resolution of the television programming to be received by the digital video recorder. When the resolution of the television programming received by the digital video recorder is the same as the recording resolution, the digital video recorder may store the television programming as recorded content to a storage device. When the resolution of the television programming received by the digital video recorder is different than the recording resolution, the digital video recorder may convert the resolution of the television programming to the recording resolution and store the television programming as recorded content to the storage device. Providing the option to select the recording resolution may enable the user to choose whether the recorded content should be at a high resolution, which may use more storage space and provide a better viewing experience, or whether the recorded content should be recorded at a lower resolution, which may use less storage space and provide a less pleasing viewing experience than the viewing experience at a higher resolution. The user may choose the recording resolution based on a number of factors, including but not limited to recording space, television programming content, the playback device that will present the recorded content, a number of times that the recorded content will be viewed, other factors, or combinations thereof.

In a particular embodiment, a method includes receiving a request to record television programming at a digital video recorder from a first device. The request specifies a recording resolution. The method includes receiving the television programming at a first resolution at the digital video recorder. The method includes determining whether the first resolution is the recording resolution and converting the television programming at the first resolution to the recording resolution when the first resolution is different than the recording resolution. The method also includes storing, via the digital video recorder, the television programming at the recording resolution at a storage device as recorded content.

In a particular embodiment, a digital video recorder includes an interface to receive television programming at a first resolution. The digital video recorder includes a processor coupled to the interface. The digital video recorder also includes a memory accessible to the processor. The memory includes instructions executable by the processor to receive a request to record the television programming. The memory includes instructions executable by the processor to send a graphical interface to a display device in response to the request. The graphical interface enables entry of user input to set a recording resolution for the television programming. The memory includes instructions executable by the processor to determine whether the first resolution is the recording resolution. The memory includes instructions executable by the processor to convert the television programming from the first resolution to the recording resolution when the recording resolution is different than the first resolution. The memory also includes instructions executable by the processor to store the television programming at the recording resolution at a storage device as recorded content.

In a particular embodiment, a computer-readable device includes instructions that, when executed by a processor, cause the processor to perform operations that include receiving a request to record television programming at a digital video recorder from a first device. The operations also include sending a graphical interface to a display device in response to the request. The graphical interface prompts a user to set a recording resolution for the television programming. The operations further include receiving the television programming at a first resolution at the digital video recorder and determining whether the first resolution is the recording resolution. The television programming at the first resolution is converted to the television programming at the recording resolution, with the digital video recorder, in response to determining that the first resolution is different than the recording resolution. After the conversion, the television programming at the recording resolution is stored at a storage device.

FIG. 1 is a block diagram of a particular embodiment of a system 100 including a digital video recorder (DVR) 102 to record television programming at a selected resolution. The system 100 may include a media device 104, a sound system 106, and a display device 108. In some embodiments, the DVR 102 may be an integral component of the media device 104. In other embodiments, the DVR 102 may be a separate component coupled to the media device 104, the display device 108, or both. The media device 104 may be a set-top box device, a computer, a tablet computer, a mobile communication device, another device, or a combination thereof that is able to send requested media content to the sound system 106, the display device 108, or both, for playback. Requested media content may be recorded content that was recorded by the DVR 102, media content stored in a memory of the media device 104, or media content received at the media device 104. The sound system 106, the display device 108, or both, may be integral components of the media device 104 or may be separate components coupled to the media device 104.

The television programming may be provided to the media device 104 by a local broadcaster 110, a service provider system 112, another entity, or combinations thereof. Television programming may include media content that is to be broadcast, multicast, or otherwise delivered to viewers at a scheduled time via a particular television channel. Television programming may include, but is not limited to, media content provided by television stations, media content corresponding to an event provided on a pay-per-view basis at a particular time, and other media content receivable via a television channel.

Television programming 114 provided by the local broadcaster 110 may be received via an antenna associated with the media device 104 when the media device 104 is tuned to a particular channel. Television programming 116 provided by a service provider system 112 may be received via a network 118 and customer premises equipment (CPE) 120. The CPE 120 may facilitate communications to and from the network 118 and a local area network (LAN) 122 coupled to or established by the CPE 120. The CPE 120 may include a router, a wireless router, a local area network device, a modem (e.g., a digital subscriber line (DSL) modem or a cable modem), a residential gateway, another communication device, or combinations thereof. The CPE 120 may be an integral component of the media device 104 or a separate component coupled to the media device 104. The service provider system 112 may be associated with a satellite service provider, a cable service provider, an internet protocol television network service provider, an internet service provider, another entity, or combinations thereof.

The media device 104 may include a processor 124. The processor 124 may be coupled to a remote interface 126, a first interface 128, a second interface 130, and a memory 132. The remote interface 126 may enable the media device 104 to send data to, and receive information from, a remote control device 134, another input device, or both. The information may include user commands to be processed by the processor 124. The remote control device 134 may also be able to communicate directly with one or more other devices (e.g., the display device 108, the sound system 106, or both).

The first interface 128 may include a network interface that enables the media device 104 to communicate via the network 118, via the LAN 122, or both. The first interface 128 may also include an antenna, or may be coupled to an external antenna, that enables the media device 104 to receive broadcasts from one or more local broadcasters (e.g., the local broadcaster 110).

The second interface 130 may enable the media device 104 to send information to, and receive information from, one or more devices coupled to the second interface 130. The one or more device may include, but are not limited to, the sound system 106, the display device 108, a storage device 136, another device, or combinations thereof. The storage device 136 may be an external memory that stores recordings made by the DVR 102.

The memory 132 may store data, such as settings 138 for the media device 104, media content, and other information. The settings 138 may include default values for various options associated with the media device 104. The default values may be accessed and changed via one or more configuration interfaces. The data may also include instructions executable by the processor 124 to perform tasks. For purposes of description, the instructions stored in the memory 132 of the media device 104 are illustrated in FIG. 1 as organized in functional modules. For example, the memory 132 may include a viewing module 140 that is executable by the processor 124 to tune to a particular channel, to receive television programming associated with the particular channel, to process the received television programming, and to send the processed television programming to the display device 108.

The memory 132 may also include the DVR 102 as a functional module that may be implemented as instructions executable by the processor 124. The DVR 102 may record television programming received by the DVR 102, schedule recording of particular television programming at a particular time for a particular time range, facilitate playback of recorded content to the display device 108 or another device, perform tasks associated with management and control of recorded media content, perform other tasks associated with recording media content, and combinations thereof. Television programming recorded by the DVR 102 may be stored to the memory 132 or to the storage device 136 depending on one or more configuration settings of the media device 104. The one or more configuration settings 138 of the media device 104 may be accessed by the processor 124.

In another embodiment, the DVR 102 is an external digital video recorder that is communicatively coupled to the media device 104. The external digital video recorder may include a processor and a memory accessible to the processor. The memory may store recorded media content (e.g., television programming) and may include instructions executable by the processor to implement digital video recorder functionality, such as instructions to implement functions of the DVR 102.

The DVR 102 may generate a DVR interface displayable on the display device 108. The DVR interface enables a user to interact with the DVR 102. The DVR interface may be a graphical user interface. One or more external devices may include DVR interface applications, or may access a DVR interface via a web page, to enable the external devices to access and control the DVR 102. For example, the one or more external devices may be a portable computing device 142 (e.g., a mobile communication device, a tablet computer, a personal digital assistant, a lap top computer, another type of communication device, or combinations thereof) that includes a DVR interface application that generates the DVR interface. The portable computing device 142 may access the DVR 102 via a mobile communication network 144 and the network 118 to enable the user to instruct the DVR 102 to start recording of particular television programming, to enable the user to instruct the DVR 102 to schedule recording of television programming at a scheduled time, to enable the user to perform media content management, or combinations thereof. As another example, the user may use a remote computer device 146 (e.g., a computer at a work site of the user, a portable computing device coupled to a network access point, etc.) to access a DVR interface webpage. After entry of appropriate identification (e.g., a user name and a password) the user may use the web page to access the DVR 102 via the network 118 to enable the user to instruct the DVR 102 to start recording particular television programming, to enable the user to instruct the DVR 102 to schedule recording of television programming at a scheduled time, to enable the user to perform media content management, or combinations thereof.

As another example, a DVR interface displayed by a computing device 148 (e.g., a mobile communication device, a tablet computer, a personal digital assistant, a desk top computer, a lap top computer, another type of communication device, or combinations thereof) may access the DVR 102 via the LAN 122 to enable the user to instruct the DVR 102 to start recording particular television programming, to enable the user to instruct the DVR 102 to schedule recording of television programming at a scheduled time, to enable the user to perform media content management, or combinations thereof. In some embodiments, one or more of the external devices 142, 146, 148 is able to receive recorded content (e.g., television programming) recorded by the DVR 102 for playback.

In an embodiment, the user may request that the DVR 102 record television programming being received by the media device 104 by pressing a record button of the remote control device 134. Pressing the record button of the remote control device 134 may cause the media device 104 to send the DVR interface to the display device 108. The DVR interface may display an identifier of the channel to be recorded and options associated with recording the television programming with default settings for the options. The default settings may be retrieved from the settings 138. The options may include, but are not limited to, a recording time, a recording resolution, and a condition for deletion of the recorded television programming. The recording time may be a particular time (e.g., 15 minutes, 30 minutes, 1 hour, or other time). The recording resolution may be a display resolution for the television programming. The recording resolution may be specified as a particular resolution (e.g., HD 1080p, HD 1080i, HD 720p, HD 720i, SD, etc.), may be specified as a level, may indicate usage is associated with a particular type of device, may indicate memory usage level, may include other information, or a combination thereof. The condition for deletion may be, but is not limited to, keep until space is needed, keep until completely viewed or substantially viewed (e.g., viewed until credits for the television programming are displayed), keep until deleted by user command, or another condition.

The user may be able to change the channel to be recorded or any of the default settings. The DVR interface may also include an accept option and a cancel option. Selection of the accept option may cause the DVR 102 to begin recording the television programming at the recording resolution indicated by the DVR interface. Selection of the cancel option may cause the DVR 102 to discontinue display of the DVR interface without recording the television programming. In a particular embodiment, the DVR 102 may cause the DVR interface to be removed from the display device 108 and cause the DVR 102 to begin recording the television programming as if the accept option was selected after passage of a period of time without receiving selection of the accept option, selection of the cancel option, a change of the channel, or a change to any of the settings for the options. The period of time may be a particular time (e.g., 5 seconds, 7 seconds, 10 seconds or another time value) that is saved in the settings 138 of the memory 132. An illustrative embodiment of a DVR interface displayed when a user presses a record button to record television programming being sent to the display device 108 is shown as FIG. 3.

The user may request the DVR 102 to record television programming being received by the media recorder or television programming to be received by the media device 104 at a scheduled time in the future. The request may be received at the media device 104 from a device (e.g., the remote control device 134, the portable computing device 142, the remote computer system 146, the computing device 148, another device, or combinations thereof).

In a particular embodiment, the user enters a command that results in display of an electronic program guide (EPG) at the device. The command may be entered via the remote control device 134 before a DVR interface is shown or via the DVR interface. The EPG may include data descriptive of television programming that is available to the media device 104 for a particular time period (e.g., a day, a week, a month, or other time period). The EPG may include data obtained from EPG data 150 received from the service provider system 112 or from another source. The user may navigate the EPG to an indicator of television programming that is available via a particular channel or the user may navigate the EPG to an indicator of television programming that is available at a scheduled time in the future via a particular channel. The user may then enter a record command (e.g., select a record option or press a record button) to display options associated with recording of the television programming. In other embodiments, the user may select television programming to be recorded in an alternate manner. For example, the user may select television programming from a listing of programs and enter the record command to record the selected television programming. The listing may be, but is not limited to, a recommendations list based on user preferences, viewing history, program popularity, other criteria, or combinations thereof; a listing based on user selected criteria (e.g., genre, popularity, program type, etc.); results of a search request based on user input; other listings of available television programming; and combinations thereof. The user may request recording of more than one program (e.g. by selecting multiple items from the listing) via a single record command.

When the record command is received, the DVR 102 may determine whether the television programming is an episode of a series. If the television programming is an episode of a series, the user may be presented with options via the DVR interface. The options may include an option to record new episodes of the program and an option to record only the selected episode. When the option to record new episodes of the program is selected, the DVR interface may display an identifier of the series, a channel to record, a start time relative to the scheduled start time, an end time relative to the scheduled end time, and options associated with recording the series with default settings for the options. The default settings may be retrieved from the settings 138. The options may include, but are not limited to, a time to begin recording relative to a scheduled begin time, a time to stop recording relative to a scheduled end time, a recording resolution, and a condition for deletion of recorded episodes (e.g., keep only the three most recent episodes, keep until space is needed, keep until completely viewed or substantially viewed, keep until deleted by user command, etc.). The user may be able to change the default settings. The DVR interface may also include an accept option and a cancel option. Selection of the accept option may cause the DVR 102 to store user configuration settings data in the settings 138 of the memory that cause the DVR 102 to schedule recording of new episodes of the series when such episodes become available. The DVR 102 may record the television programming at the recording resolution received via the DVR interface. The DVR 102 may also begin recording the current episode at the recording resolution received via the DVR interface when selected television programming is currently available to the media device 104. Selection of the cancel option may end a set-up session for scheduling recording of the series. An illustrative embodiment of a DVR interface displayed when the user enters a selection for the DVR 102 to record episodes of a series is shown as FIG. 4.

When the television programming selected to be recorded is not an episode of a series, or when the user selects to record only the selected episode of a series, the DVR interface may display an identifier of the program to be recorded, the channel to be recorded, a start time relative to the scheduled start time, an end time relative to the scheduled end time, and options associated with recording the television programming with default settings for the options. The default settings may be retrieved from the settings 138. The options may include, but are not limited to, a time to begin recording relative to a scheduled start time, a time to stop recording relative to a scheduled end time, a recording resolution, and a condition for deletion of recorded episodes (e.g., keep until space is needed, keep until completely viewed or substantially viewed, keep until deleted by user command, etc.). The user may be able to change the default settings via the DVR interface or another interface. The DVR interface may also include an accept option and a cancel option. Selection of the accept option may cause the DVR 102 to store user configuration settings data in the settings 138 of the memory that cause the DVR 102 to record the television programming at the recording resolution received via the DVR interface at a scheduled time, or may cause the DVR 102 to begin recording the television programming at the recording resolution received via the DVR interface when the selected television programming is currently available to the media device 104. Selection of the cancel option may end a set-up session for scheduling recording of the television programming. An illustrative embodiment of a DVR interface displayed when the user enters a selection for the DVR 102 to record particular television programming is shown as FIG. 5.

After receiving a request to record television programming and receiving options related to the recording of the television programming via the DVR interface, the DVR 102 may receive the television programming at a particular time. The particular time may be the time of the recording request when the DVR 102 is to record television programming currently available to the media device 104, or the particular time may be a scheduled time. The DVR 102 may determine a resolution of the received television programming. The resolution may be determined based on an amount of received data used to produce a particular portion of the television programming, based on a service level agreement for a particular account associated with the request to record the television programming, based on a resolution associated with the channel carrying the television programming, based on another determination method, or combinations thereof. For example, the television programming may be received at the media device 104 via a local broadcast from the local broadcaster 110. The resolution may be determined based on a number of horizontal lines that are used to render a frame of the television programming, based on a type of scanning (e.g., progressive scanning or interlaced scanning), based on a rate of display delivery (e.g., frames or fields per second), or combinations thereof. As another example, the television programming may be received via a cable television service provider. The resolution may be determined based on whether a service level agreement specifies that high definition (HD) television programming is to be provided or that standard definition (SD) television programming (e.g., a 480i resolution based on a National Television System Committee (NTSC) system or a 576i resolution based on a Phase Alternating Line (PAL) system or a Séquentiel Couleur à Mémoire (SECAM) system) is to be provided to the media device 104. As another example, the television programming may be provided from the service provider system 112 via a HD channel. The resolution would be determined to be HD resolution since television programming carried by the channel is HD television programming.

The DVR 102 may determine whether the recording resolution received via the DVR interface is the same as the requested recording resolution. When the resolution is the same as the recording resolution, the DVR 102 may save the television programming as recorded content to the memory 132, the storage device 136, or both. When the resolution is different than the recording resolution, the DVR 102 converts the television programming at the resolution to the recording resolution and saves the television programming at the recording resolution as the recorded content to the memory 132, the storage device 136, or both.

In some embodiments, the resolution may be a three-dimensional (3D) resolution and the recording resolution may be a particular two-dimensional (2D) resolution (e.g., a 2D HD resolution, a 2D SD resolution, a 2D low resolution, etc.). The DVR 102 may convert the television programming from the 3D resolution to the particular 2D resolution when the DVR 102 records the television programming. In some embodiments, the resolution may be a SD resolution and the recording resolution may identify high resolution. The DVR 102 may up convert the television programming from the SD resolution to a higher resolution when the DVR 102 records the television programming, though in some cases the higher resolution may not be full HD resolution. In some embodiments, the resolution may be a SD resolution or a HD resolution, and the recording resolution may be a low resolution. The low resolution may be suitable for display on portable devices, such as the portable computing device 142. The DVR 102 may down convert the television programming from the SD or HD resolution to the low resolution when the DVR 102 records the television programming as recorded content.

After the television programming is recorded at the recording resolution, a viewer may access the recorded content via the DVR interface and view the recorded content at the recording resolution via the display device 108. In some embodiments, the viewer may access the recorded content via the DVR interface, transfer the television programming to a first device (e.g., the portable computing device 142 or the computing device 148), and view the recorded content at the recording resolution via the first device.

Figure 2:
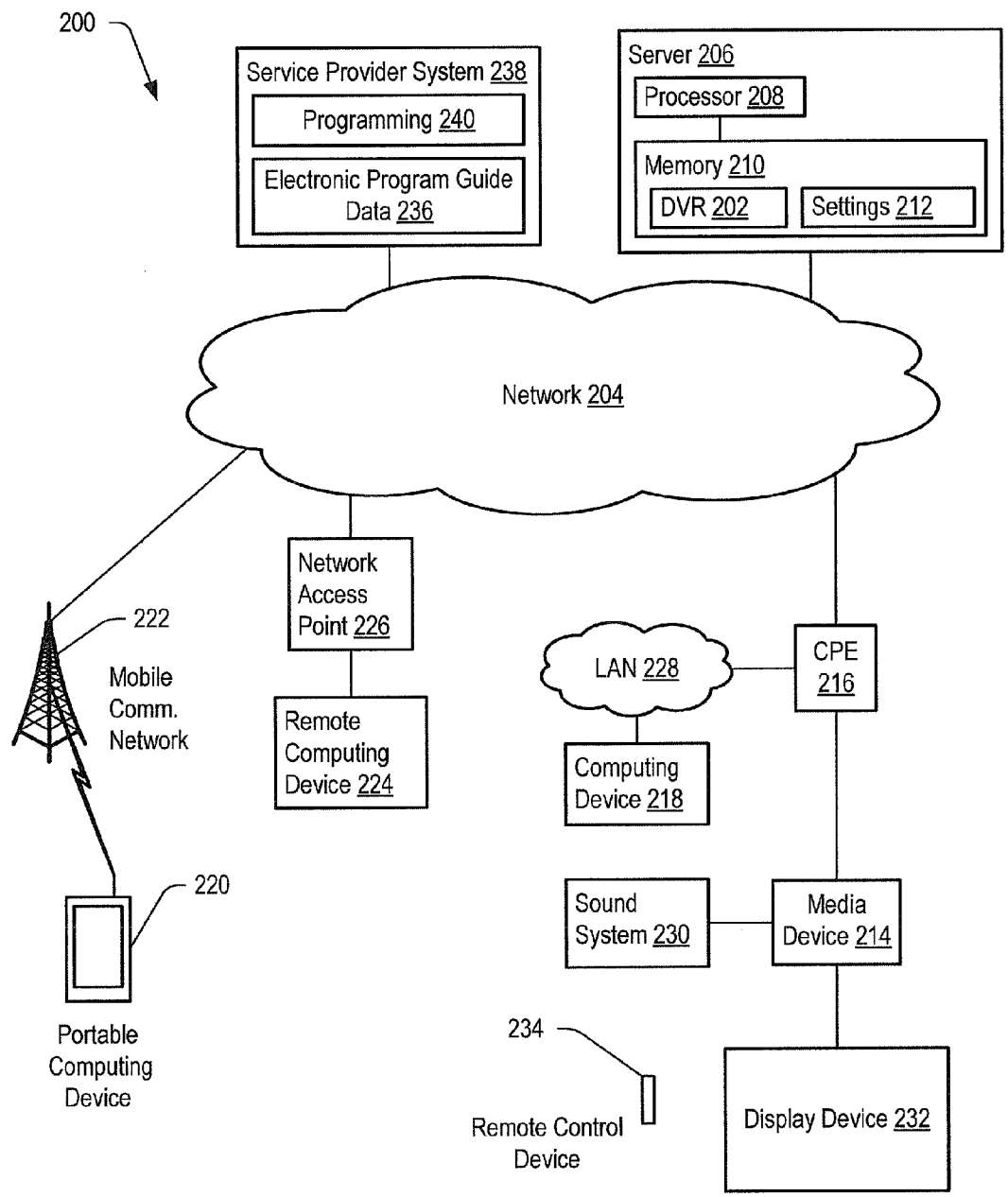
FIG. 2 is a block diagram of a second embodiment of a system including a network media recorder that enables recording at a selected resolution.

FIG. 2 is a block diagram of a particular embodiment of a system 200 including a digital video recorder (DVR) 202 to record television programming at a selected resolution. The DVR 202 may be a network DVR. The DVR 202 may receive requests via a network 204 to record television programming. The requests may be received from one or more users that are associated with an account that enables access to the DVR 202. The DVR 202 may record the requested television programming, store recorded media content (e.g., recorded television programming) for the one or more users, and make the recorded media content of a particular user available to the particular user via the network 204. In some embodiments, a fee may be charged to an account for the ability to use the DVR 202, a fee may be charged to the account for actual usage of the DVR 202 by a user associated with the account, a fee may be charged to the account for storage of recorded media content (e.g., television programming) when a storage space of the recorded media content exceeds a particular size, other fees associated with the DVR 202 may be charged to the one account, or combinations thereof.

The DVR 202 may be a part of a server 206. The server 206 may be a single device or a plurality of devices that enable DVR functionality. The server 206 may include a processor 208 and a memory 210. The memory 210 may store data, media content (e.g., television programming), and other information. The data may include settings 212 that include default values for various options associated with the DVR 202 for accounts authorized to use the DVR 202. Settings 212 for a particular account may be accessed, changed, or both via a configuration interface available to one or more users associated with the particular account. The memory 210 may also include instructions executable by the processor 208. The instructions executable by the processor 208 may be organized in functional modules, such as the DVR 202.

The DVR 202 may be operable to record requested television programming received by the server 206, to schedule recording of television programming at a particular time when requested television programming is available, to facilitate playback of recorded content to viewers that request recording of the television programming, to perform tasks associated with management and control of recorded content (e.g., television programming) for users associated with accounts with access to the DVR 202, to perform other tasks associated with recording content, and combinations thereof. Content recorded by the DVR 202 may be stored to the memory 210 or to external memory (not shown).

A user associated with an account that has access to the DVR 202 may access the DVR 202 via the network 204 using one or more devices. The one or more devices may include, but are not limited to, a media device 214 coupled to the network 204 via customer premises equipment (CPE) 216, a computing device 218 (e.g., a mobile communication device, a tablet computer, a personal digital assistant, a desk top computer, a lap top computer, another type of communication device, or combinations thereof) coupled to the network 204 via the CPE 216, a portable computing device 220 (e.g., a mobile communication device, a tablet computer, a personal digital assistant, a lap top computer, another type of communication device, or combinations thereof) coupled to the network 204 via a mobile communication network 222, a remote computing device 224 (e.g., a mobile communication device, a tablet computer, a personal digital assistant, a desk top computer, a lap top computer, another type of communication device, or combinations thereof) coupled to the network 204 via a network access point 226, another device, or combinations thereof. The CPE 216 may facilitate communications to and from the network 204 and a local area network (LAN) 228 coupled to or established by the CPE 216. The CPE 216 may include a router, a wireless router, a local area network device, a modem (e.g., a digital subscriber line (DSL) modem or a cable modem), a residential gateway, another communication device, or combinations thereof. The media device 214 may be a set-top box device, a computer, a tablet computer, a mobile communication device, another device, or a combination thereof that is able to send requested media content (e.g., television programming) to a sound system 230, a display device 232, or both, for playback. The media device 214 may receive input via a remote control device 234 or other input device (e.g., a game controller, mouse, touch screen, etc.).

The user may request that the DVR 202 record television programming being received by the media device 214 by pressing a record button of the remote control device 234. Pressing the record button of the remote control device 234 may cause the media device 214 to send a DVR interface to the display device 232. The DVR interface may display an identifier of the channel to be recorded and options associated with recording the television programming with default settings for the options. The default settings may be retrieved from the settings 212. The options may include, but are not limited to, a recording time, a recording resolution, and a condition for deletion of the recorded television programming. The recording time may be a particular time (e.g., 15 minutes, 30 minutes, 1 hour, or other time). The recording resolution may be a display resolution for the television programming. The recording resolution may be specified as a particular resolution, may be specified as a level, may indicate usage is associated with a particular type of device, may indicate memory usage level, may include other information, or may be a combination thereof. The condition for deletion may be, but is not limited to, keep until space is needed, keep until completely viewed or substantially viewed (e.g., viewed until credits for the television programming are displayed), keep until deleted by user command, or another condition.

The user may be able to change the channel to be recorded or any of the default settings. The DVR interface may also include an accept option and a cancel option. Selection of the accept option may cause the DVR 202 to begin recording the television programming at the recording resolution indicated in the DVR interface. Selection of the cancel option may cause the DVR 202 to remove the DVR interface without recording the television programming. The DVR 202 may cause the DVR interface to be removed from the display device 232. In a particular embodiment, the DVR 202 may begin recording the television programming as if the accept option was selected after passage of a period of time without receiving selection of the accept option, selection of the cancel option, a change of the channel, or a change to any of the settings for the options. The period of time may be a particular time (e.g., 5 seconds, 7 seconds, 10 seconds or another time value) that is saved in the settings 212 of the memory 210. An embodiment of a DVR interface displayed when the user presses a record button to record television programming being sent to the display device 232 is shown as FIG. 3.

The one or more devices 214, 218, 220, 224 may generate a DVR interface, may receive the DVR interface from the server 206, or may access a DVR interface via a web page to enable the one or more devices 214, 218, 220, 224 to access and control the DVR 202. The DVR interface may include an option that enables a user to request recording of television programming. When the user chooses the option to request recording of television programming, the DVR interface may access electronic program guide (EPG) data 236 from a service provider system 238. The DVR interface may display an EPG. The EPG may include data descriptive of television programming that is available to the DVR 202 for recording during a time period (e.g., a day, a week, a month, or other time period). The user may navigate the EPG to view or select an indicator of television programming of interest that is available via a particular channel, or the user may navigate the EPG to view or select an indicator of television programming that is available at a scheduled time via a particular channel. The user may then enter a record command (e.g., select a record option or press a record button) to display options associated with recording the television programming. In other embodiments, the user may select television programming to be recorded in an alternate manner. For example, the user may select television programming from a listing of programs and enter the record command to record the selected television programming. The listing may be, but is not limited to, a recommendations list based on user preferences, viewing history, program popularity, other criteria, or combinations thereof; a listing based on user selected criteria (e.g., genre, popularity, program type, etc.); results of a search request based on user input; other listings of available television programming; and combinations thereof. The user may request recording of more than one program via a single command.

When the record command is received, the DVR 202 may determine whether the television programming is an episode of a series. When the television programming is an episode of a series, the user may be presented with options via the DVR interface. The options may include an option to record new episodes of the program and an option to record only the selected episode. When the option to record new episodes of the program is selected, the DVR interface may display an identifier of the series, a channel to record, a start time relative to the scheduled start time, an end time relative to the scheduled end time, and options associated with recording the series with default settings for the options. The default settings may be retrieved from the settings 212 stored in the memory 210. The options may include, but are not limited to, a time to begin recording relative to a scheduled begin time, a time to stop recording relative to a scheduled end time, a recording resolution, and a condition for deletion of recorded episodes. The user may be able to change the start time relative to the scheduled start time, the stop time relative to the scheduled end time, and the default settings. The DVR interface may also include an accept option and a cancel option. Selection of the accept option may cause the DVR 202 to store user configuration settings data in the settings 212 of the memory 210. The DVR 202 may record the television programming at the recording resolution received via the DVR interface. The DVR 202 may also record a current episode at the recording resolution received via the DVR interface when selected television programming is available to the server 206. Selection of the cancel option may end a set-up session for scheduling recording of the series. An illustrative embodiment of a DVR interface displayed when the user enters a selection for the DVR 202 to record episodes of a series is shown as FIG. 4.

When the television programming selected to be recorded is not an episode of a series, or when the user selects to record only the selected episode, the DVR interface may display an identifier of the program to be recorded, the channel to be recorded, a start time relative to the scheduled start time, an end time relative to the scheduled end time, and options associated with recording the television programming with default settings for the options. The default settings may be retrieved from the settings 212 in the memory 210. The options may include, but are not limited to, a time to begin recording relative to a scheduled start time, a time to stop recording relative to a scheduled end time, a recording resolution, and a condition for deletion of recorded episodes (e.g., keep until space is needed, keep until completely viewed or substantially viewed, keep until deleted by user command, etc.). The user may be able to change the start time relative to the scheduled start time, the stop time relative to the scheduled end time, and the default settings. The DVR interface may also include an accept option and a cancel option. Selection of the accept option may cause the DVR 202 to store user configuration settings data in the settings 212 of the memory 210, or may cause the DVR 202 to be begin recording the television programming at the recording resolution received via the DVR interface when the selected television programming is available to the server 206. Selection of the cancel option may end a set-up session for scheduling recording of the television programming.

After receiving a request to record television programming and receiving options related to the recording of the television programming via the DVR interface, the DVR 202 may receive the television programming at a particular time from the programming 240 of the service provider system 238 or from another source. The particular time may be the time when the DVR 202 is requested to record television programming available to the server 206, or the particular time may be a scheduled time. The DVR 202 may determine a resolution of the received television programming. The resolution may be determined based on an amount of received data used to produce a particular portion of the television programming, based on a service level agreement for a particular account associated with the request to record the television programming, based on another determination method, or combinations thereof.

The DVR 202 may determine whether the recording resolution received via the DVR interface is the same as the resolution. The resolution may be determined based on an amount of received data used to produce a particular portion of the television programming, based on a service level agreement for a particular account associated with the request to record the television programming, based on a resolution associated with the channel carrying the television programming, based on another determination method, or combinations thereof. When the resolution is the same as the recording resolution, the DVR 202 may save the television programming as a recording of the television programming at the recording resolution to the memory 210. When the resolution is different than the recording resolution, the DVR 202 converts the television programming at the first resolution to the recording resolution and saves the television programming at the recording resolution to the memory 210. After the television programming is recorded at the recording resolution, a viewer may access the television programming from the server 206 via the DVR interface and view the television programming at the recording resolution on one of the one or more devices 218, 220, 224 or another device that provides access to the server 206.

Figure 3:
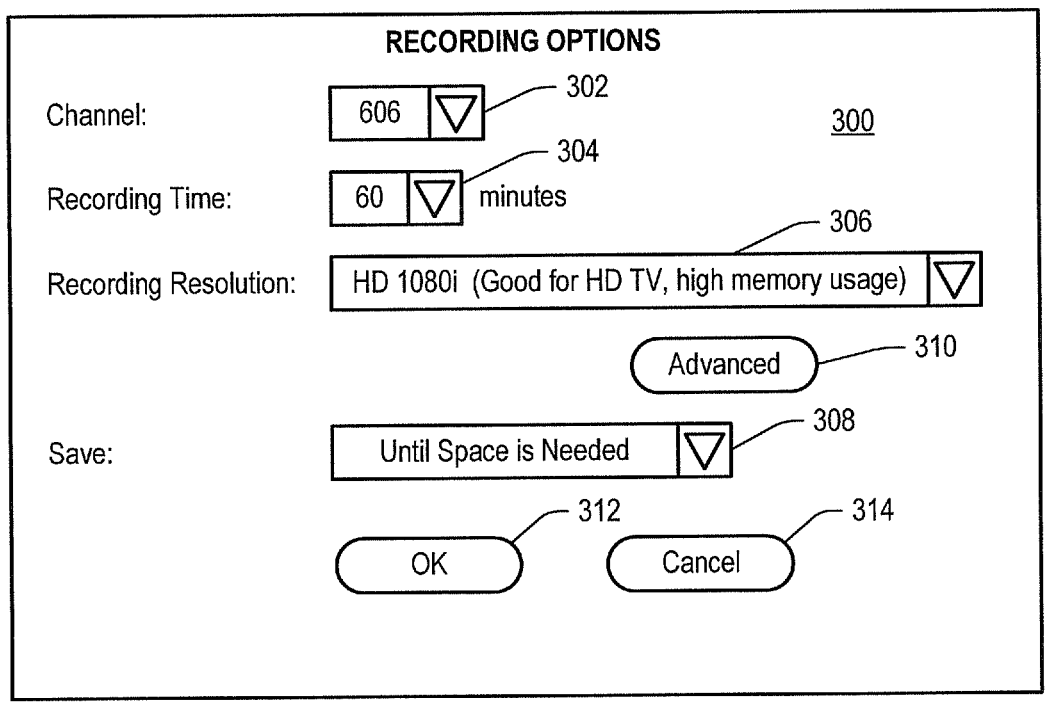
FIG. 3 is a representation of an embodiment of a digital video recorder interface for entering information and options usable by a digital video recorder (DVR) to record television programming.

Referring to FIG. 3, an embodiment of a DVR interface 300 for entering information and options usable by a DVR to record television programming that is being sent to a display device at a time when a viewer enters a command to record the television programming. The DVR interface 300 may overlay a portion of the television programming being sent to the display device.

The DVR interface 300 may include a plurality of user selectable input options 302-308. The user selectable input options 302-308 may include any combination of input options, such as text entry boxes, pull down menus, radio buttons, check boxes, or other selectable inputs. The DVR interface 300 may include a channel option 302, a recording time option 304, a recording resolution option 306, and a deletion condition option 308. Each user selectable input option 302-308 may be associated with indicia descriptive of the user selectable input option 302-308.

The channel option 302 may display a number or other indicator of a channel that is to be recorded. An initial entry in the channel option 302 may correspond to the channel being displayed. The user may change the initial entry. The initial entry may be changed by selecting the initial entry with an input device and overwriting the initial entry with a different channel number or channel identifier via the input device. The user may also change the initial entry by selecting an arrow of the channel option 302 to display a listing of available channels, and the user may select a displayed entry of the listing to have the entry populated in the channel option 302.

In some embodiments, changing the initial entry of the channel option 302 to a new entry may cause the media device to change the television programming sent to the display device in the background of the DVR interface 300 from television programming associated with the channel corresponding to the initial entry to television programming associated with the channel corresponding to the new entry. In other embodiments, the television programming sent to the display device (e.g., television programming associated with the channel corresponding to the initial entry) may continue to be sent to the display device after the new entry is entered in the channel option 302.

The recording time option 304 may display a number of minutes that programming of the channel identified in the channel option 302 is to be recorded. An initial entry in the recording time option 304 may be a default value. The initial entry may be changed by selecting the initial entry with an input device and overwriting the initial entry with a different time. The user may also change the initial entry by selecting an arrow of the recording time option 304 to display a listing of recording times, and the user may select a displayed entry of the listing to have the entry populated in the recording time option 304.

The recording resolution option 306 may display a recording resolution for the television programming. An initial entry in the recording resolution option 306 may be a default value. The initial entry may be changed by selecting an arrow of the recording resolution option 306 to display a listing of available resolutions, and the user may select a displayed entry of the listing to have the entry populated in the recording resolution option 306.

An advanced option 310 may be associated with the recording resolution option 306. When the user wants a resolution that is not included in the listing of available resolutions displayed when the user selects the arrow of the recording resolution option 306, the user may select the advanced option 310. The advanced option 310 may cause one or more additional DVR interfaces to be displayed that enable the user to enter a resolution not included in the listing or a user defined recording resolution. When the user enters a user defined recording resolution, the user defined recording resolution may be assigned a name by the user, may be saved to a memory, and may appear as the name in the listing of available resolutions displayed when the user subsequently selects the arrow of the recording resolution option 306. A requested resolution not included in the listing selected by the user after the advanced option 310 is selected or the user defined recording resolution created after selection of the advanced option 310 may be populated in the recording resolution option 306.

The delete condition option 308 may display a condition to be met before recordings may be deleted by the DVR. An initial entry in the delete condition option 308 may be a default value. The initial entry may be changed by selecting an arrow of the delete condition option 308 to display a listing of available delete conditions, and the user may select a displayed entry of the listing to have the entry populated in the delete condition option 308.

The DVR interface 300 may also include an accept option 312 and a cancel option 314. Selection of the accept option 312 may result in the DVR receiving the entries specified by the options 302-308 so that the DVR can begin recording the requested television programming. Selection of the cancel option 314 may cancel recording of the television programming and remove display of the DVR interface 300.

Figure 4:
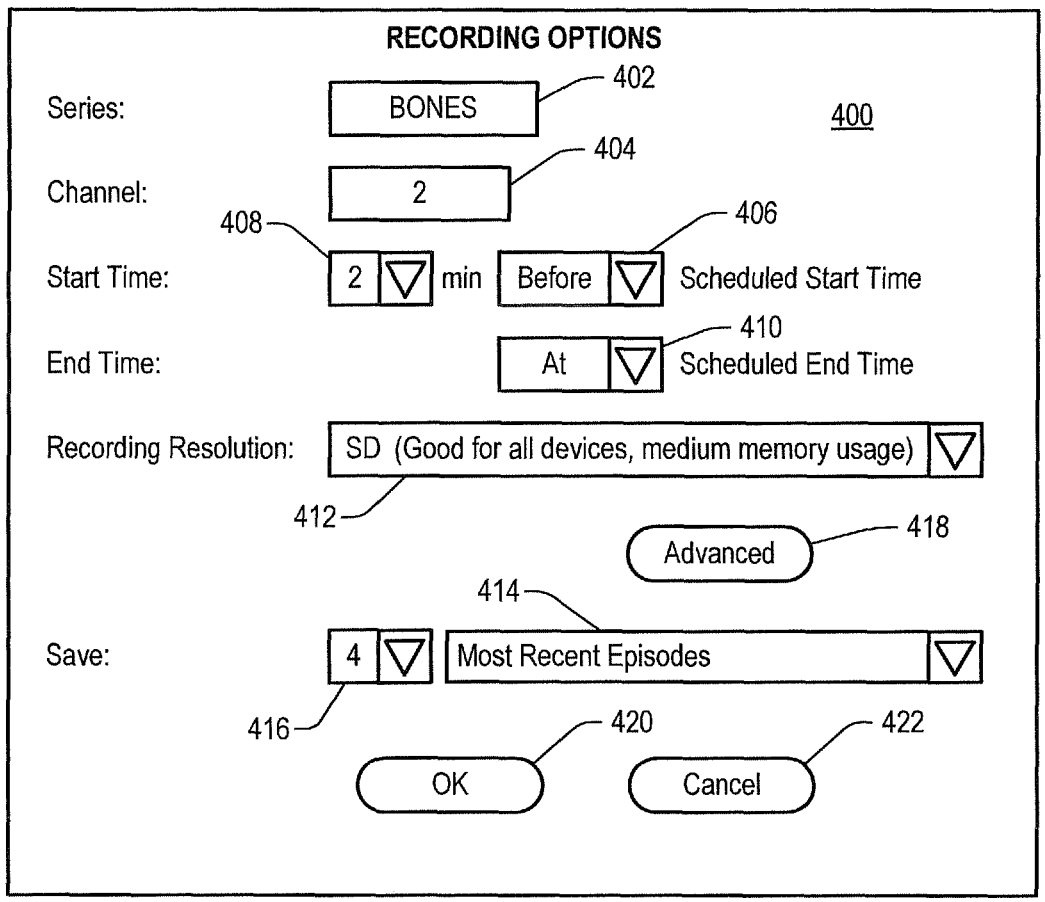
FIG. 4 is a representation of an embodiment of a digital video recorder interface for entering information and options usable by a digital video recorder to record episodes of a series of television programming.

FIG. 4 depicts an illustrative embodiment of a DVR interface 400 for entering options usable by a DVR to record a series of television programming selected from an electronic program guide or from a listing of television programming. The DVR interface 400 may display a title window 402 that shows a title of the series to be recorded and a channel window 404 that displays a channel that provides episodes of the series at scheduled times. Entries in the title window 402 and the channel window 404 may or may not be user selectable. The DVR interface 400 may include a plurality of user selectable input options 406-416. The user selectable input options 406-416 may include any combination of input options, such as text entry boxes, pull down menus, radio buttons, check boxes, or other selectable inputs. The DVR interface 400 may include a first start time option 406, a second start time option 408, an end time option 410, a recording resolution option 412, a first deletion condition option 414, and a second deletion condition option 416.

The first start time option 406 may identify whether the recording is to start before the scheduled start time, at the scheduled start time, or after the scheduled start time. An initial entry in the first start time option 406 may be a default value. The initial entry may be changed by selecting an arrow of the first start time option 406 to display a listing of other available entries. The user may select a displayed entry of the listing to have the entry populated in the first start time option 406. When the entry in the first start time option 406 is "At", the second start time option 408 may be removed or grayed to indicate that no value can be entered.

The second start time option 408 may display a number of minutes before or after the scheduled start time for recording that the DVR is to start recording the television programming. An initial entry in the second start time option 408 may be a default value. The initial entry may be changed by selecting the initial entry with an input device and overwriting the initial entry with a different time. The user may also change the initial entry by selecting an arrow of the second start time option 408 to display a number listing, and the user may select a displayed entry of the number listing to have the entry populated in the second start time option 408.

The end time option 410 may identify whether the recording is to end before the scheduled end time, at the scheduled end time, or after the scheduled end time. An initial entry in the end time option 410 may be a default value. The initial entry may be changed by selecting an arrow of the end time option 410 to display a listing of other available entries, and the user may select a displayed entry of the listing to have the entry populated in the end time option 410. When the entry in the end time option 410 is "Before" or "After", a second end time option may be displayed as a user selectable option.

The recording resolution option 412 may display a recording resolution for the television programming. An initial entry in the recording resolution option 412 may be a default value. The initial entry may be changed by selecting an arrow of the recording resolution option 412 to display a listing of available resolutions, and the user may select a displayed entry of the listing to have the entry populated in the recording resolution option 412.

An advanced option 418 may be associated with the recording resolution option 412. The user may select the advanced option 418 to select or input a resolution that is not included in the listing of available resolutions displayed when the user selects the arrow of the recording resolution option 412. The advanced option 418 may cause one or more additional DVR interfaces to be displayed that enable the user to enter a desired resolution not included in the listing or to input a user defined recording resolution. When the user enters a user defined recording resolution, the user defined recording resolution may be assigned a name by the user, may be saved to a memory, and may appear as the name in the listing of available resolutions displayed when the user subsequently selects the arrow of the recording resolution option 412. A resolution not included in the listing selected by the user after the advanced option 418 is selected or the user defined recording resolution created after selection of the advanced option 418 may be populated in the recording resolution option 412.

The first delete condition option 414 may display a condition to be met before recordings are deleted by the DVR. An initial entry in the first delete condition option 414 may be a default value. The initial entry may be changed by selecting an arrow of the first delete condition option 414 to display a listing of available delete conditions. The user may select a displayed entry of the listing to have the entry populated in the first delete condition option 414. The entry in the first delete condition option 414 may make deletion conditional on a number of episodes. For example, the delete condition may be to keep the four most recent episodes. When a fifth episode is recorded, the DVR may delete the oldest of the four episodes stored by the DVR. When the entry in the first delete condition option 414 is dependent on a particular number, the second delete condition option 416 may be displayed. When the first delete condition 414 is not dependent on the entry in the first delete condition option 414 (e.g., the entry in the first delete condition 414 is "Until Deleted" or "Until Viewed") the second delete condition option 416 may be removed or grayed to indicate that no value can be entered.

The DVR interface 400 may also include an accept option 420 and a cancel option 422. Selection of the accept option 420 may result in the DVR receiving the entries specified by the options 406-416 so that the DVR can schedule recording of the series of television programming, record an episode that is currently available, or both. Selection of the cancel option 422 may cancel recording of the series of television programming.

Figure 5:
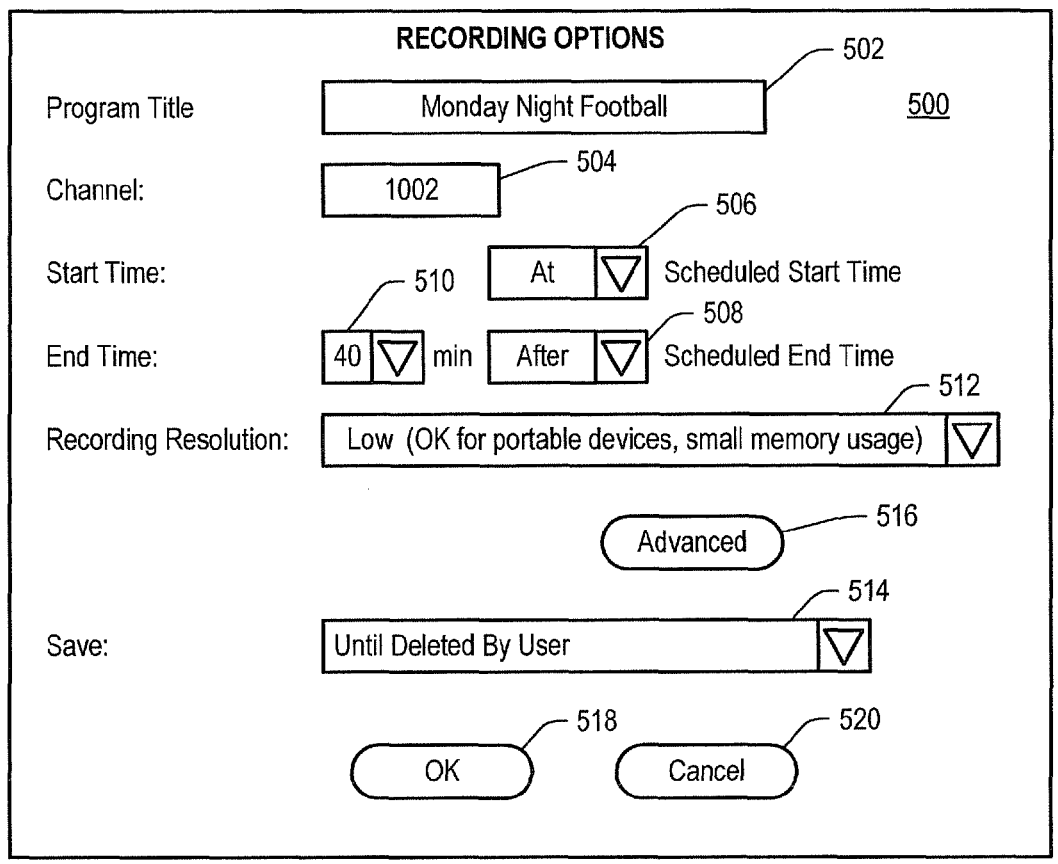
FIG. 5 is a representation of an embodiment of a digital video recorder interface for entering information and options usable by a digital video recorder to record particular television programming.

FIG. 5 depicts an illustrative embodiment of a DVR interface 500 for entering options usable by a DVR to record television programming selected from an electronic program guide or from a listing of television programming. The DVR interface 500 may display a title window 502 that shows a title of the series to be recorded and a channel window 504 that displays a channel that provides the television programming at a scheduled time. Entries in the title window 502 and the channel window 504 may or may not be selectable. The DVR interface 500 may include a plurality of user selectable input options 506-514. The user selectable input options 506-514 may include any combination of input options, such as text entry boxes, pull down menus, radio buttons, check boxes, or other selectable inputs. The DVR interface 500 may include a start time option 506, a first end time option 508, a second end time option 510, a recording resolution option 512, and a deletion condition option 514.

The start time option 506 may identify whether the recording is to start before the scheduled start time, at the scheduled start time, or after the scheduled start time. An initial entry in the start time option 506 may be a default value. The initial entry may be changed by selecting an arrow of the start time option 506 to display a listing of other available entries, and the user may select a displayed entry of the listing to have the entry populated in the start time option 506. When the entry in the start time option 506 is "Before" or "After", a second start time option may be displayed as a user selectable option.

The first end time option 508 may identify whether the recording is to end before the scheduled end time, at the scheduled end time, or after the scheduled end time. An initial entry in the first end time option 508 may be a default value. The initial entry may be changed by selecting an arrow of the first end time option 508 to display a listing of other available entries, and the user may select a displayed entry of the listing to have the entry populated in the first end time option 508. When the entry in the first end time option 508 is "At", the second end time option 510 may be removed or grayed to indicate that no value can be entered.

The second end time option 510 may display a number of minutes before or after the scheduled end time for recording that the DVR is to stop recording the channel indicated in the channel window 504. An initial entry in the second end time option 510 may be a default value. The initial entry may be changed by selecting the initial entry with an input device and overwriting the initial entry with a different time. The user may also change the initial entry by selecting an arrow of the second end time option 510 to display a number listing, and the user may select a displayed entry of the number listing to have the entry populated in the second end time option 510.

The recording resolution option 512 may display a recording resolution for the television programming. An initial entry in the recording resolution option 512 may be a default value. The initial entry may be changed by selecting an arrow of the recording resolution option 512 to display a listing of available resolutions, and the user may select a displayed entry of the listing to have the entry populated in the recording resolution option 512.

An advanced option 516 may be associated with the recording resolution option 512. The user may select the advanced option 516 to select or input a resolution that is not included in the listing of available resolutions displayed when the user selects the arrow of the recording resolution option 512. The advanced option 516 may cause one or more additional DVR interfaces to be displayed that enable the user to enter a desired resolution not included in the listing or a user defined recording resolution. When the user enters a user defined recording resolution, the user defined recording resolution may be assigned a name by the user, may be saved to a memory, and may appear as the name in the listing of available resolutions displayed when the user subsequently selects the arrow of the recording resolution option 512. A resolution not included in the listing selected by the user after the advanced option 516 is selected or the user defined recording resolution created after selection of the advanced option 516 may be populated in the recording resolution option 512.

The delete condition option 514 may display a condition to be met before recordings are deleted by the DVR. An initial entry in the delete condition option 514 may be a default value. The initial entry may be changed by selecting an arrow of the delete condition option 514 to display a listing of available delete conditions, and the user may select a displayed entry of the listing to have the entry populated in the delete condition option 514.

The DVR interface 500 may also include an accept option 518 and a cancel option 520. Selection of the accept option 518 may result in the DVR receiving the entries specified by the options 506-516 so that the DVR can schedule recording of the television program or begin recording the television programming when the scheduled programming is currently available. Selection of the cancel option 520 may cancel recording of the series of television programming.

Figure 6:
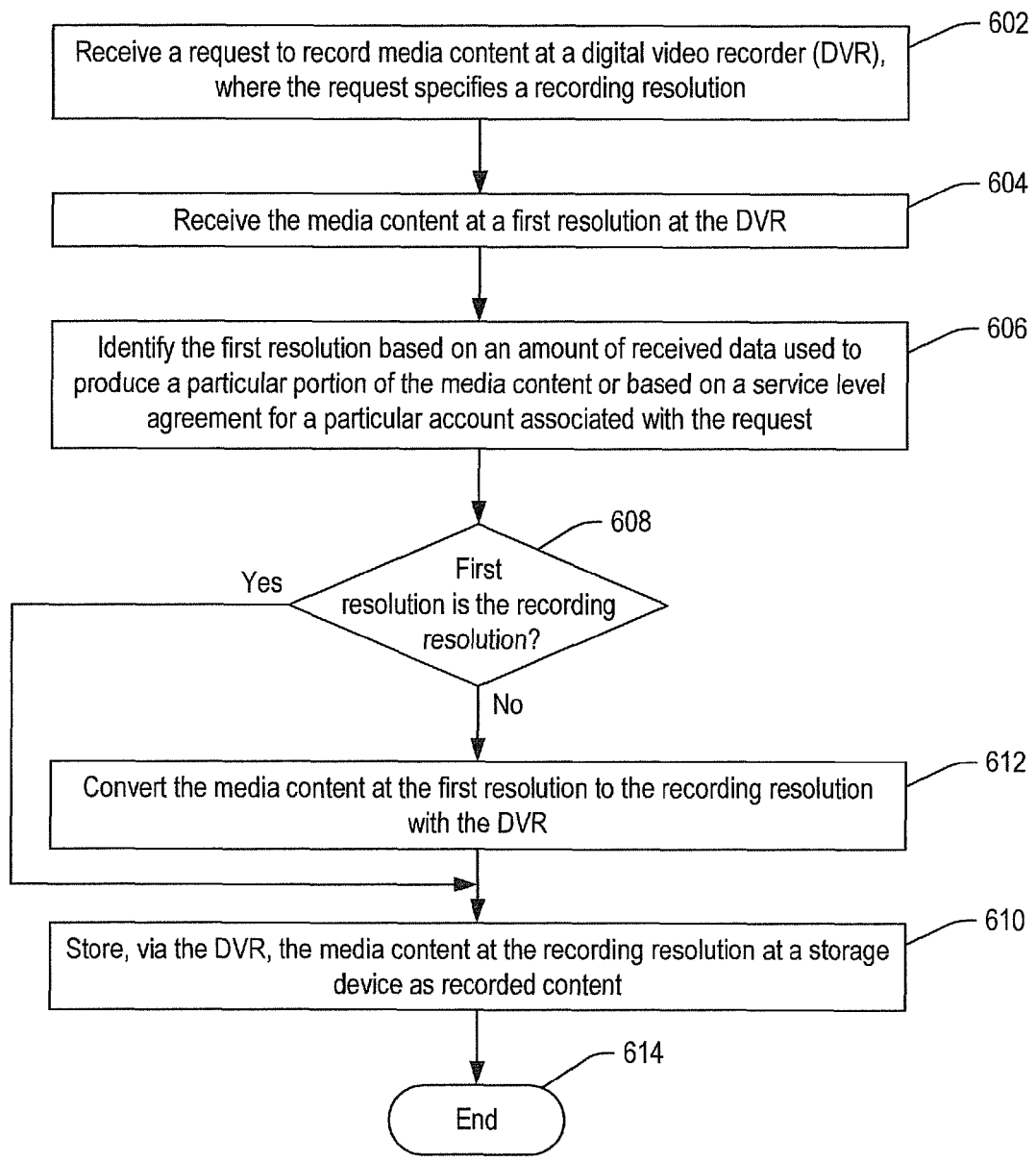
FIG. 6 is a flow chart of an embodiment of a first method to record television programming to a digital video recorder at a selected resolution.

Referring to FIG. 6, a flow chart of a first particular embodiment of a method to record media content to a digital video recorder (DVR) at a selected resolution is shown. The method may be performed by a DVR that is a component of a media device (e.g., the media device 104 depicted in FIG. 1), a stand-alone DVR, or a network DVR (e.g., the DVR 202 depicted in FIG. 2).

At 602, a request to record media content may be received at the DVR, where the request specifies a recording resolution. The request may be to record media content that is to be received at the DVR at a scheduled time in the future. For example, an electronic program guide may display programming that is available at a time in the future at a display device. A user may select a particular entry in the electronic program guide and select an option to have the DVR schedule to record the program. Alternately, the request may be to record media content that is currently being sent to the display device. For example, the user may select a record button on a remote control device to record media content that is being displayed at the display device via the DVR.

The media content may be received at a first resolution at the DVR, at 604. The first resolution may be identified, at 606. The first resolution may be identified based on an amount of data used to produce a particular portion of the media content, based on a service level agreement for a particular account associated with the request, or both. For example, the media content may be received via a local broadcast from a broadcast station. An identity of the first resolution may be based on a number of horizontal lines that are used to render a frame of the media content, based on a type of scanning (e.g., progressive scanning or interlaced scanning), based on a rate of display delivery (e.g., frames or fields per second), or combinations thereof. As another example, the media content may be received via a cable television service provider. The identity of the first resolution may be based on whether a service level agreement, or other information such as metadata, specifies that HD media content is to be provided or that SD media content is to be provided.

The first resolution is compared to the recording resolution, at 608. The comparison may be made by the DVR. When the first resolution is the same as the recording resolution, the media content at the recording resolution may be stored via the DVR at a storage device as recorded content, at 610. The storage device may be part of the DVR or the storage device may be separate from the DVR. In this case, the method may end, at 614.

When the first resolution is not the same as the recording resolution, the media content at the first resolution may be converted to the media content at the recording resolution with the DVR, at 612. A down conversion may be performed at the DVR when the recording resolution is lower than the first resolution. An up conversion may be performed at the DVR when the recording resolution is higher than the first resolution. After the conversion, the media content at the recording resolution may be stored at the storage device as the recorded content, at 610. The method may end, at 614.

Figure 7:
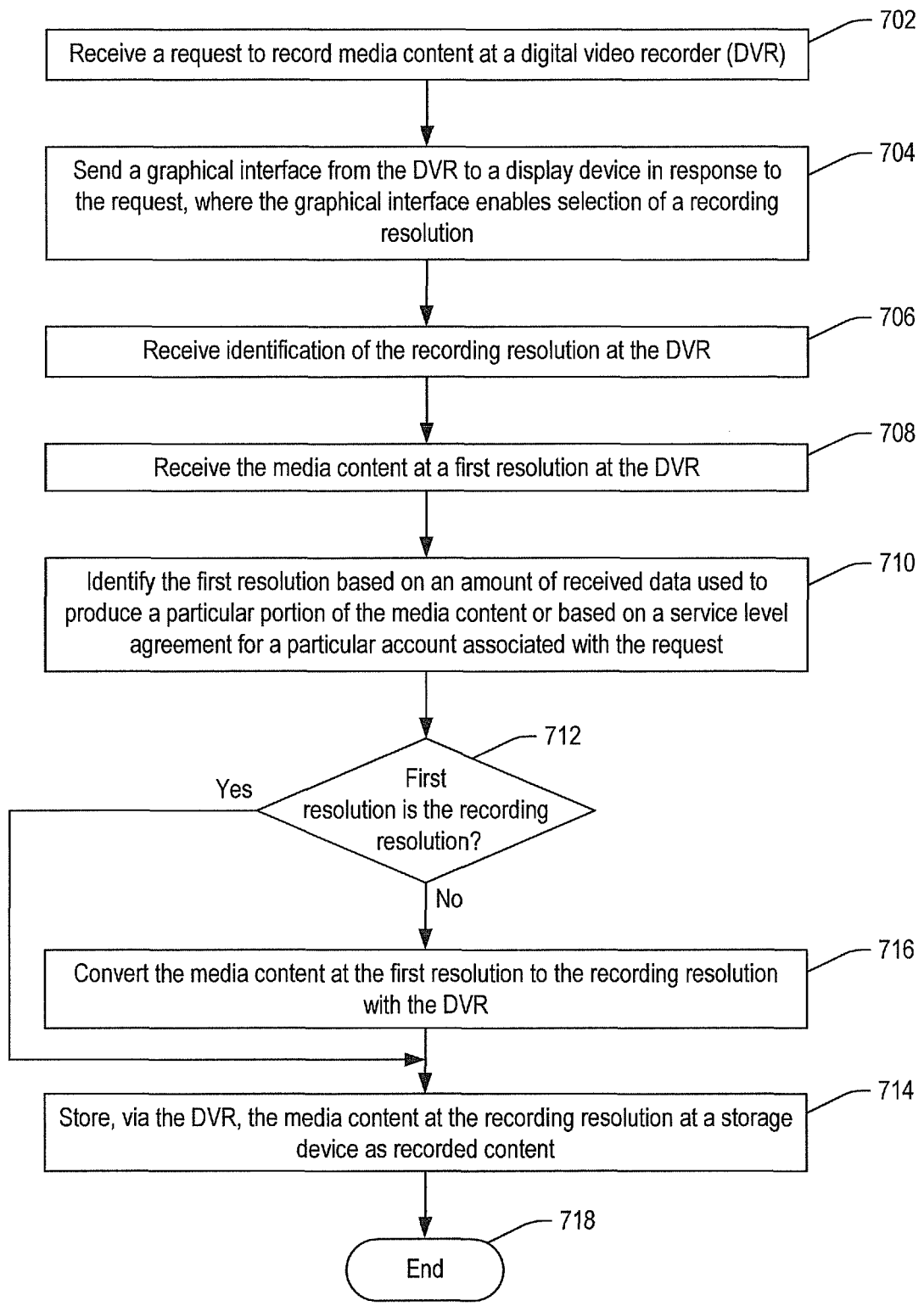
FIG. 7 is a flow chart of an embodiment of a second method to record television programming to a digital video recorder at a selected resolution.

Referring to FIG. 7, a flow chart of a second particular embodiment of a method to record media content to a digital video recorder (DVR) at a selected resolution is shown. The method may be performed by a DVR that is a component of a media device (e.g., the media device 104 depicted in FIG. 1), a stand-alone DVR, or a network DVR (e.g., the DVR 202 depicted in FIG. 2).

At 702, a request to record media content is received at the DVR. The request may be to record media content that is to be received at the DVR at a scheduled time in the future. For example, an electronic program guide may display programming that is available at a time in the future at a display device. A user may select a particular entry in the electronic program guide and select an option to have the DVR schedule to record the program. Alternately, the request may be to record media content that is currently being sent to the display device. For example, the user may select a record button on a remote control device to record media content that is being displayed at the display device via the DVR.

A graphical interface may be sent from the DVR to the display device in response to the request, at 704. The graphical interface may enable selection of a recording resolution and other parameters associated with recording the media content. The graphical interface may include a window that displays a default resolution. The user may accept the default resolution by making no change to the default resolution. To select a different resolution, the user may select an option (e.g., a down arrow displayed in a portion of the window) to display a listing of available resolutions. The user may select a resolution from the listing of available resolutions. The listing of available resolutions may include entries corresponding to particular resolutions (e.g., HD 1080p, HD 1080i, SD, etc.), quality levels (e.g., high, medium, low), quality levels associated with devices (high—television, low—television, high—portable device, low—portable device, etc.), other resolutions, or combinations thereof. As another option, the user may select from other resolutions not included in the listing of resolutions, the user may be able to enter a particular resolution, or both. The graphical interface may include an accept option and a cancel option. When the user is satisfied with the resolution and the other parameters associated with recording the media content, the user may select the accept option to record the media content. When the request is a request to record media content that is currently being displayed to the display device, or to record media content that is available for immediate display, the interface may be removed from the display device after a time period (e.g., three seconds, five seconds, ten seconds, or another time period) when no user interaction with the graphic interface is received. In this case, the DVR may record the media content as if the accept option was selected. To cancel the request, the user may select the cancel option.

Identification of the recording resolution may be received at the DVR, at 706. The identification may be received from the graphical interface along with other information to record the media content. When the media content is to be recorded at a scheduled time, the recording resolution and the information may be saved, and the DVR may schedule the recording to occur at the scheduled time. When the media content is currently available for recording, the recording resolution and the information may be used by the DVR to record the media content.

The media content may be received at a first resolution at the DVR, at 708. The first resolution may be identified, at 710. The first resolution may be identified based on an amount of data used to produce a particular portion of the media content, based on a service level agreement for a particular account associated with the request, or both. For example, the media content may be received via a local broadcast from a broadcast station. An identity of the first resolution may be based on a number of horizontal lines that are used to render a frame of the media content, based on a type of scanning (e.g., progressive scanning or interlaced scanning), based on a rate of display delivery (e.g., frames or fields per second), or combinations thereof. As another example, the media content may be received via a cable television service provider. The identity of the first resolution may be based on whether a service level agreement, or other information, specifies that HD media content is to be provided or that SD media content is to be provided.

The first resolution is compared to the recording resolution, at 712. The comparison may be made by the DVR. When the first resolution is the same as the recording resolution, the media content at the recording resolution may be stored via the DVR at a storage device as recorded content, at 714. The storage device may be part of the DVR or the storage device may be separate from the DVR. The method may end, at 718.

When the first resolution is not the same as the recording resolution, the media content at the first resolution may be converted to the media content at the recording resolution with the DVR, at 716. A down conversion may be performed at the DVR when the recording resolution is lower than the first resolution. An up conversion may be performed at the DVR when the recording resolution is higher than the first resolution. After the resolution conversion, the media content at the recording resolution may be stored at the storage device as the recorded content, at 714. The method then ends, at 718.

Various embodiments disclosed herein enable a user to specify a recording resolution for recording television programming. The ability to specify the recording resolution enables the user to balance recording space requirements to save the television programming as recorded content against a viewing experience during playback of the recorded content. Recording at a high resolution may use a large amount of recording space, but may provide an enhanced viewing experience. Recording at a low resolution may use less recording space than recording at a higher resolution, but the viewing experience during playback of the recorded content may be less pleasing. Enabling the user to specify a recording resolution for television programming stored to a network DVR may reduce bandwidth requirements to a system. A significant number of people may request television content to be recorded at a resolution less than the resolution typically provided to the people by a service provider when the people receive the television programming for instantaneous viewing view a display device. Providing recorded content at a resolution that is less than the resolution typically provided resolution may result in less bandwidth usage by the service provider. Also, some of the people may never retrieve the recorded content from storage, which also results in less bandwidth usage.

Figure 8:
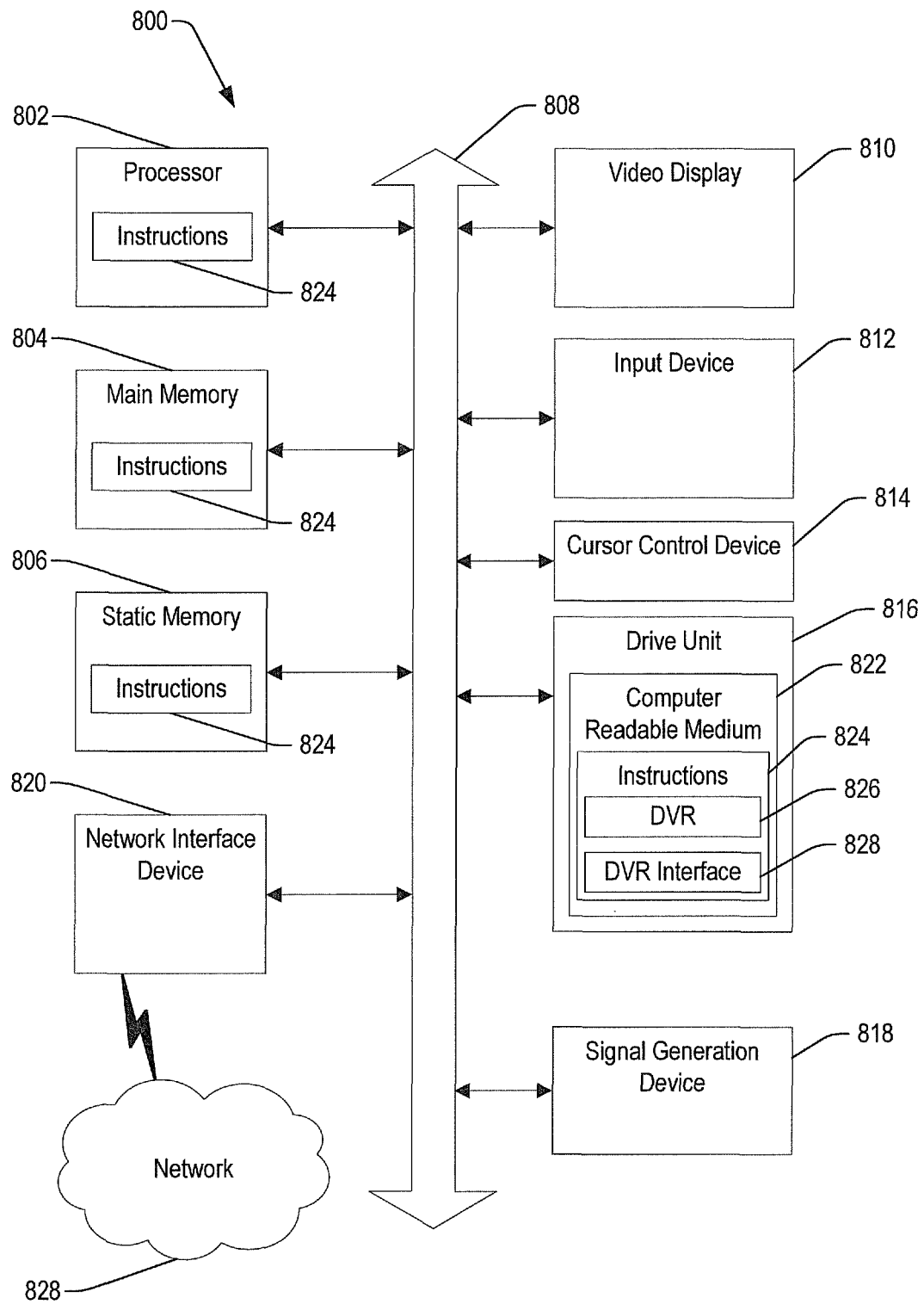
FIG. 8 is a block diagram of an illustrative embodiment of a general computer system.

Referring to FIG. 8, an illustrative embodiment of a general computer system is shown and is designated 800. The computer system 800 may include a set of instructions that can be executed to cause the computer system 800 to perform any one or more of the methods or computer based functions disclosed herein. The computer system 800 may operate as a standalone device or may be connected, e.g., using a network, to other computer systems or peripheral devices. For example, the computer system 800 may include or be included within any one or more of the media devices 104, 214, the service provider systems 112, 238, the CPE 120, 216, the remote control devices 134, 234, the storage device 136, the portable computing devices 142, 220, the remote computer systems 146, 224, the computing devices 148, 218, the server 206, or the network access point 226 described with reference to FIG. 1 and FIG. 2.

In a networked deployment, the computer system 800 may operate in the capacity of a server or as a client user computer in a server-client user network environment, or as a peer computer system in a peer-to-peer (or distributed) network environment. The computer system 800 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 800 may be implemented using electronic devices that provide video, audio, or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. Moreover, the computer system 800 may include a main memory 804 and a static memory 806, which can communicate with each other via a bus 808. As shown, the computer system 800 may further include a video display unit 810, such as a liquid crystal display (LCD), a flat panel display, a solid state display, or a lamp assembly of a projection system. Additionally, the computer system 800 may include an input device 812, such as a keyboard, and a cursor control device 814, such as a mouse. The computer system 800 may also include a drive unit 816, a signal generation device 818, such as a speaker or remote control, and a network interface device 820. Some computer systems 800 may not include an input device (e.g., a server may not include an input device).

In a particular embodiment, as depicted in FIG. 8, the drive unit 816 may include a computer-readable storage device 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable storage devices. The instructions 824 in the drive unit 816, the main memory 804, the static memory 806, the processor 802, or combinations thereof may include a digital video recorder 826. The instructions 824 in the drive unit 816, the main memory 804, the static memory 806, the processor 802, or combinations thereof may include a digital video recorder interface 828 that generates one or more user interfaces for communication with the digital video recorder 826, enables input of data associated with the digital video recorder 826 (e.g., a recording resolution), or both.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage device 822 that stores instructions 824 or receives, stores and executes instructions 824, so that a device connected to a network 830 may communicate voice, video or data over the network 830. While the computer-readable storage device is shown to be a single device, the term "computer-readable storage device" includes a single device or multiple devices, such as a centralized or distributed database, and/or associated caches and servers that store one or more sets of instructions. The term "computer-readable storage device" shall also include any medium that is capable of storing a set of instructions for execution by a processor or that device a computer system to perform any one or more of the methods or operations disclosed herein.

In a particular non-limiting, exemplary embodiment, the computer-readable storage device may include a solid-state memory such as a memory card or other package that houses one or more non-volatile read-only memories. Further, the computer-readable storage device may be a random access memory or other volatile re-writable memory. Additionally, the computer-readable storage device may include a magneto-optical or optical medium, such as a disk or tapes or other storage device. Accordingly, the disclosure is considered to include any one or more of a computer-readable storage device and other equivalents and successor media, in which data or instructions may be stored.

Although the present specification describes components and functions that may be implemented in particular embodiments with reference to particular standards and protocols, the disclosed embodiments are not limited to such standards and protocols. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
 receiving a request to record television programming at a digital video recorder;
 receiving the television programming at the digital video recorder;
 determining a resolution of the television programming;
 determining a recording resolution that is not included in the request, wherein the recording resolution is determined independently of the resolution, wherein the television programming is to be stored as recorded television programming at the recording resolution, and wherein the recording resolution is determined based on an output resolution of a display device configured to play the recorded television programming;
 comparing the resolution of the television programming to the recording resolution;
 in response to the resolution being different than the recording resolution, converting the television programming to the recording resolution with the digital video recorder, wherein converting the television programming to the recording resolution comprises performing an up conversion in response to the recording resolution being higher than the resolution; and
 storing, via the digital video recorder, the television programming at the recording resolution at a storage device.

2. The method of claim 1, wherein the recording resolution is determined based on a user account associated with the request, and wherein an indication of the recording resolution is stored at the digital video recorder.

3. The method of claim 2, wherein the digital video recorder stores data associated with a second user account, and wherein the second user account is associated with a second recording resolution that is different from the recording resolution.

4. The method of claim 1, wherein the up conversion is performed in response to the output resolution of the display device being higher than the resolution.

5. The method of claim 1, wherein the determination of the resolution is based on an amount of received data used to produce a particular portion of the television programming.

6. The method of claim 1, wherein converting the television programming to the recording resolution comprises performing a down conversion in response to the recording resolution being lower than the resolution.

7. The method of claim 1, wherein the display device is associated with a media playback device, a customer premises equipment device, a mobile communication device, a portable computing device, or a combination thereof.

8. The method of claim 1, wherein the request is received from a remote control device and wherein the request is received in response to user input via a graphical interface to record television programming that is being sent to the display device.

9. The method of claim 1, wherein the up conversion produces a modified television program with a modified resolution, wherein the modified resolution is higher than the resolution, and wherein the modified resolution is lower than the output resolution.

10. The method of claim 1, wherein determining the resolution is based on a type of scanning of the television programming.

11. A device comprising:
an interface to receive television programming;
a processor coupled to the interface; and
a memory accessible to the processor, the memory comprising instructions that, when executed by the processor, cause the processor to perform operations comprising:
receiving a request to record the television programming, wherein the request is associated with a user account;
determining a resolution of the television programming;
determining a recording resolution that is not included in the request, wherein the recording resolution is determined independently of the resolution, wherein the television programming is to be stored as recorded television programming at the recording resolution, and wherein the recording resolution is determined based on an output resolution of a display device configured to play the recorded television programming;
comparing the resolution of the television programming to the recording resolution;
converting the television programming from the resolution to the recording resolution in response to determining that the recording resolution is different than the resolution, wherein converting the television programming to the recording resolution comprises performing an up conversion in response to the recording resolution being higher than the resolution; and
storing the television programming at the recording resolution at a storage device.

12. The device of claim 11, wherein the recording resolution is a particular resolution for playback via a mobile communication device associated with the display device, and wherein the operations further comprise sending a copy of the television programming to the mobile communication device from the storage device.

13. The device of claim 12, wherein the recording resolution is lower than a standard definition resolution.

14. The device of claim 11, wherein converting the television programming from the resolution to the recording resolution comprises converting the television programming from the resolution to a lower resolution in response to the recording resolution being lower than the resolution.

15. The device of claim 11, wherein determining the resolution is based on a rate of display delivery of the television programming.

16. The device of claim 11, wherein the resolution is a three-dimensional resolution, and wherein the recording resolution is a two-dimensional resolution.

17. A computer-readable storage device comprising instructions that, when executed by a processor, cause the processor to perform operations comprising:
receiving a request to record television programming at a digital video recorder;
receiving the television programming at a resolution at the digital video recorder;
determining the resolution;
determining a recording resolution that is not included in the request, wherein the recording resolution is determined independently of the resolution, wherein the television programming is to be stored as recorded television programming at the recording resolution, and wherein the recording resolution is determined based on an output resolution of a display device configured to play the recorded television programming;
comparing the resolution of the television programming to the recording resolution;
converting the television programming to the television programming at the recording resolution with the digital video recorder in response to determining that the resolution is different than the recording resolution, wherein converting the television programming to the recording resolution comprises performing an up conversion in response to the recording resolution being higher than the resolution; and
storing the television programming at the recording resolution at a storage device.

18. The computer-readable storage device of claim 17, wherein determining the resolution is based on a content source of the television programming.

19. The computer-readable storage device of claim 18, wherein the request is associated with an account serviced by a television service provider, wherein the content source is the television service provider, and wherein the resolution is based on a service level agreement associated with the account.

20. The computer-readable storage device of claim 18, wherein the request is associated with an account serviced by a television service provider, wherein the content source is a channel provided by the television service provider, and wherein the resolution is based on a particular resolution associated with the channel.

* * * * *